April 26, 1960  R. H. CASLER  2,934,382
HYDRAULIC CONTROL SYSTEM
Filed Sept. 12, 1956  2 Sheets-Sheet 1
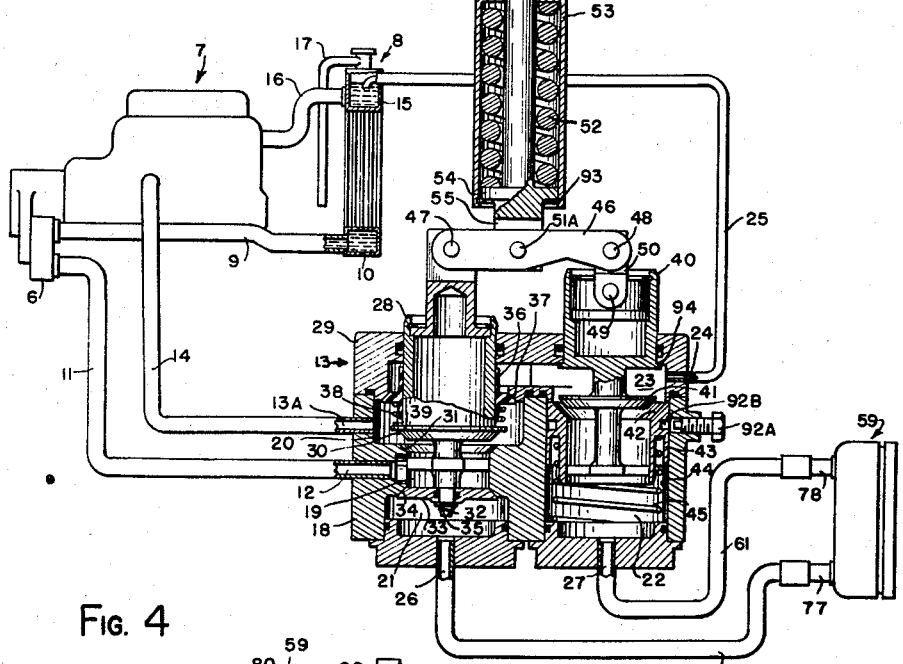
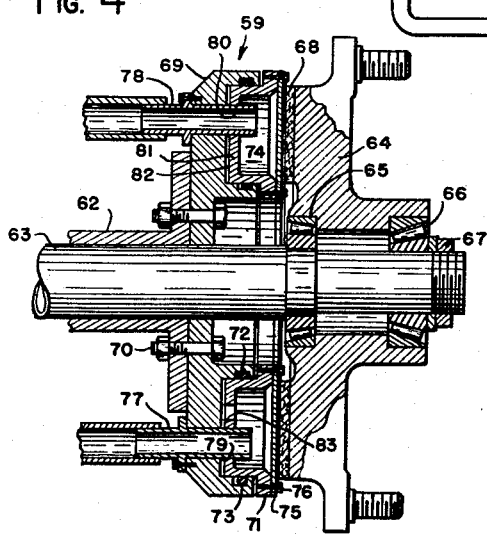
INVENTOR
ROGER H. CASLER
BY *Scrivener and Parker*
ATTORNEYS April 26, 1960  R. H. CASLER  2,934,382
HYDRAULIC CONTROL SYSTEM Filed Sept. 12, 1956  2 Sheets-Sheet 2

INVENTOR
ROGER H. CASLER

BY *Scrivner and Parker,*

ATTORNEYS

United States Patent Office 2,934,382
Patented Apr. 26, 1960

2,934,382

HYDRAULIC CONTROL SYSTEM

Roger H. Casler, Washington, Conn., assignor to Roy S. Sanford, Wilfred A. Eaton and Erling D. Sedergren, all of Woodbury, and Roger H. Casler and James O. Eames, both of Washington, Conn.

Application September 12, 1956, Serial No. 609,466

15 Claims. (Cl. 303—54)

This invention relates to brake mechanism, and more particularly to control mechanism for a brake.

The control mechanism to be described is particularly adapted to control the operation of friction brakes of the type wherein the brake is cooled by a circulating cooling liquid, and is actuated by the pressure of the circulating liquid, and it is accordingly one of the objects of the invention to provide novel control valve mechanism for controlling the operation of a brake of this type.

Another object of the invention is to provide control valve mechanism for a brake of the above type, wherein means are provided for controlling the amount of cooling liquid flowing through the brake as well as the pressure of the circulating cooling liquid for actuating the brake.

Yet another object of the invention is to provide control valve mechanism for a brake of the above type, wherein the force applied by the operator to operate the control valve mechanism is substantially proportional to the pressure of the liquid which serves to effect the brake application.

Another object of the invention is to provide brake valve mechanism so constituted that in the event of failure of the liquid supply system to the brake, over travel means are provided for permitting the operation of a separate emergency brake by the operator with the same control pedal.

Still another object of the invention is to provide valve mechanism so constituted as to control the flow of circulating liquid through the brake mechanism in accordance with degree of brake application desired.

These and other objects and novel features of the invention will be more fully understood when taken in connection with the accompanying drawings and the following description.

In the drawings, wherein similar parts are designated by similar reference characters throughout the several views:

Fig. 1 is a diagrammatic view, partially in section, of the novel control valve mechanism connected in a brake system;

Fig. 4 is a sectional view of a brake adapted for use with the above control valve mechanism.

Figure 2:
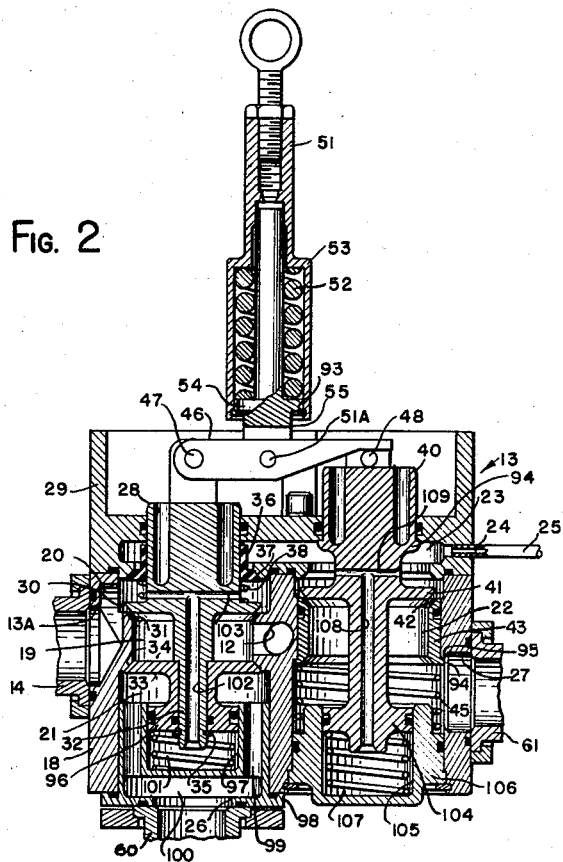
Fig. 2 is a view in section of a modified form of the control valve mechanism of Fig. 1.

As shown in Fig. 1, a liquid pump 6, preferably of the positive displacement type, is arranged to be driven by a vehicle engine 7 of the liquid cooled type, a radiator 8 being provided for cooling the engine. A conduit 9 connects a bottom tank 10 of the radiator with the inlet of the pump 6 and an outlet conduit 11 extends from the outlet of the pump to an inlet port 12 in a control valve mechanism 13. The valve mechanism is provided with an outlet port 13A connected to the water jacket of the engine 7 by means of a conduit 14, and the upper portion of the water jacket in turn is connected to an upper tank 15 of the radiator by means of a conduit 16.

The upper tank of the radiator is also provided with an atmospheric vent pipe 17 as shown. As will be hereinafter described, the ports 12 and 13A of the control valve are normally connected when the brake is released, and consequently when the engine is running, liquid is drawn from the lower tank of the radiator through conduit 9, and is pumped back to the upper tank 15 of the radiator by the pump 6 through the conduit 11, the port 12, the valve mechanism 13, the outlet port 13A, the conduit 14, the engine 7 and the conduit 16. Thus, in normal operation, the liquid pumped by the pump 6 circulates through the engine and radiator in a normal fashion to cool the engine.

Referring now to the control valve mechanism as shown in Fig. 1, the mechanism includes a housing 18 provided with an inlet chamber 19, an outlet chamber 20, a brake supply chamber 21, a first brake return chamber 22, a second brake return chamber 23, and a vent port 24 in the wall of the latter chamber connected with the upper tank of the radiator by means of a vent conduit 25. Brake supply chamber 21 is provided with a brake supply port 26, while brake return chamber 22 is provided with a brake return port 27.

A by-pass valve piston or first pressure responsive member 28 is slidably mounted in a cover 29 on the valve housing 18, as shown, this member being provided adjacent its lower end with an outlet valve 30 normally spaced from a valve seat 31 at the upper end of chamber 19. A stem 32, extending downward from the lower end of member 28 carries a brake supply valve 33 thereon, this valve being adapted to normally engage a valve seat 34 formed in the housing at the lower end of chamber 19. The valve 33 is retained in place on the valve stem by a snap ring 35, and thus when the member 28 is moved in the valve housing, the valves 30 and 33 move simultaneously. The portion of the member 28 above the valve 30 has a check valve 36 slidably mounted thereon, and normally maintained in engagement with a valve seat 37 formed at the upper end of chamber 20 by means of a spring 38 interposed between the check valve and a flange 39 on the member 28, as shown. The portion of the valve mechanism as above described constitutes the by-pass portion of the valve, and as heretofore stated, serves to normally permit the circulation of engine cooling liquid through the valve and engine radiator in the normal manner.

Referring now more particularly to the right hand portion of the valve mechanism 13, a piston or second pressure responsive member 40 is slidably mounted in the valve housing cover 29, and is provided with a restricting valve 41 which is normally spaced from a valve seat 42 formed on the upper end of a sleeve 43 slidably mounted in a bore 44 of the valve housing and normally maintained in the position shown against the bottom surface of the cover 29 by means of a spring 45.

A proportioning beam 46 is connected to the upper end of the member 28 by means of a pivot pin 47, while the right end of the beam is connected to the member 40 by means of pivot pins 48 and 49 and an interconnecting link 50. A valve operating element 51 is pivotally connected to the beam intermediate the pins 47 and 48 by means including a pin 51A, and a graduating spring 52 connected in series therebetween. The valve operating element is provided with a cage portion 53, and the graduating spring is interposed between the upper end of that cage portion and a flange 54 formed on a connecting member 55 which is pivotally connected to beam 46 by means of the pin 51A. The valve element is in turn connected by means of a pin 56, to a brake pedal or brake lever 57, pivotally mounted on a suitable bracket 58 as shown. The brake supply port 26 of chamber 21 is connected to a brake actuator 59 by means of a conduit 60, and the outlet of the brake actuator is in turn connected to port 27 of the brake return chamber 22 by means of a conduit 61.

The brake actuator 59, shown in section in Fig. 4, is of the type wherein the friction element of the brake is directly cooled by a cooling liquid circulated under pressure through the brake actuator, and the pressure of the circulating liquid is utilized to effect engagement of the friction elements of the brake mechanism. As shown in Fig. 4, the brake mechanism includes an axle housing 62 having an axle tube 63 therein and secured thereto, and a vehicle wheel 64 rotatably mounted on the outer end of the tube by means of suitable bearings 65 and 66, the bearings being retained on the axle tube by means of a nut 67. The wheel is provided on its inner face with an annular friction lining ring, 68, preferably of a composition material having low heat conductivity, this ring of course rotating with the wheel. An annular cylinder 69 is secured to the axle housing as by means of bolts 70, and an annular rigid piston 71 is slidably mounted in the bore of the cylinder and sealed against leakage by means of sealing rings 72 and 73 as shown. The piston is provided with an annular channel 74 at its right end, and the open end of the channel is closed by a thin annular metallic friction plate 75, secured along its inner and outer peripheries to the right end of the piston by means of suitable screws 76, the metallic plate thus forming the end wall of the channel. The parts are so dimensioned and positioned with respect to the friction ring 68, that the metallic friction element 75 is adapted to engage the left face of the friction ring when it is desired to effect a brake application. Inlet and outlet conduits 77 and 78 are secured to the back wall of the cylinder member 69, and extend therethrough and into the channel 74 of the piston through bores 79 and 80 in back wall 81 of the piston. It will be apparent from the foregoing that the piston and cylinder form a pressure chamber 82 therebetween, and this pressure chamber, in the present embodiment of the invention, is connected to the channel 74 in the piston by means of a port 83 in the back wall of the piston. As the brake is shown in the drawings, the conduit 77 may be considered as the inlet conduit of the brake actuator, and the conduit 78 may be considered as the outlet conduit, although these relationships may of course be reversed if desired.

With regard to the operation of the brake actuator, it will be apparent that the entire surface of the metallic friction element 75 opposite the surface which is positioned to engage the rotating friction ring 68 is subjected on the left side to the action of the cooling liquid circulation through the channel 74, this being circulated by supplying liquid to the brake through the conduit 77 and discharging it through the conduit 78. Since the channel 74 is connected to the pressure chamber 82 by means of the port 83, it will be apparent that the pressure chamber will be subjected to the pressure of the liquid in the channel 74, and that this pressure will be operative to move the piston to the right in the cylinder in order to effect engagement of the metallic friction element and the friction ring. As will be explained more fully hereinafter, the flow of cooling liquid to the brake, and the discharge of cooling liquid from the brake, is so controlled as to also control the pressure of the liquid in the pressure chamber 82 to thus control the degree of application of the brake at the will of the operator.

Referring now to Fig. 1 again, it will be noted that the brake lever 57 is provided with a return spring 84 serving to normally maintain the brake lever in release position, it being understood that with the brake lever in the position shown, the control valve parts and the control valve operating element will also be in the position shown.

In the embodiment shown in Fig. 1, it will be noted that the valves 30, 33, and 41, are all of the same diameter, and consequently for reasons to be more fully described hereinafter, the pivot pin 51A which connects the beam 46 to the member 55, is not in the center of the beam, but is rather moved slightly to the left of the center point. With the parts in the position shown, it will be understood that liquid is free to pass from the conduit 11 through the valve chamber 19 and back through the engine through the conduit 14 to effect normal circulation of the cooling liquid through the engine. The chamber 21 is isolated from the chamber 19 by the closed valve 33, and the outlet conduit 78 of the brake actuator is connected to the valve chamber 22 through conduit 61 and port 27 and to the chamber 23 past the open valve 41. In order to prevent the building up of any pressure in the brake with the brake pedal in release position, it will be noted that the chamber 23 is connected to the upper tank of the radiator through conduit 25, and that the upper tank is in turn vented to the atmosphere through the conduit 17 as described. Consequently in the event any leakage of liquid occurs, due to defective valves, into the brake mechanism past the closed valves 33 and 36 through the conduits 60 and conduit 77 or 61 and 78, it will be impossible for this leakage to build up any appreciable pressure in the brake, since the brake is vented to atmosphere as above stated. It should also be noted in this connection, that the closed check valve 36 prevents the flow of liquid from the chamber 20 to the upper tank of the radiator through the chamber 23 and the vent line 25. Thus it will be seen, that with the brake pedal or lever in release position and the supply valve closed, there is no circulation of cooling liquid through the brake actuator, and the only pressure in the brake actuator is that due to the head of the liquid in the brake system above the actuator.

Assuming now that it is desired to effect a brake application, the lever 57 is moved in a counter-clockwise direction to depress the member 51, and the latter, acting through the graduating spring 52 moves the member 55 and the pivot pin 51A downwardly to effect movement of the proportioning beam 46. Since under this condition of operation, it is to be understood that the engine is operating and that the pump 6 is pumping liquid through the chamber 19 of the valve and back to the engine through the open outlet valve 30 and the chamber 20, it will be apparent that any downward movement of the pivot pin 51A will tend to move the valves 30, 33, and 41. Since at that time, there is no liquid flowing through the brake actuator, the initial movement of these valves is indeterminate to some extent, and it may be that the restricting valve 41 will initially close, followed by downward movement of the member 28 to open the supply valve 33 and close, or start to close, the outlet valve 30, in order to restrict the flow of liquid between the chambers 19 and 20. When this action occurs, a portion of the liquid will flow past open valve 33, into chamber 21, and thence to the brake actuator through the conduit 60 and the conduit 77. This liquid will flow through the brake actuator as previously described, and thence back to the control valve chamber 22 through the conduits 78 and 61. In the event the valve 41 is fully closed, a pressure will immediately be built up in the chamber 22 which will tend to open the valve, and due to the drop in pressure of the flowing liquid between the chambers 21 and 22 through the brake actuator, the pressure in the chamber 22 will always be less than the pressure in the chamber 21 when the cooling liquid is flowing through the actuator. In any case, the pressure built up in the chamber 22 will tend to hold the valve 41 open, whereupon the cooling liquid from the brake will flow back to the engine through the partially opened valve 41, the chamber 23, the check valve 36, the chamber 20, and the conduit 14, this liquid of course then returning to the radiator through the conduit 16. Thus, under this condition of operation, assuming that the valve 30 has not been fully closed, some of the cooling liquid supplied by the pump 6 will pass through the control valve and directly back to the engine, while another portion of this liquid will pass through the control valve and to the brake actuator, and thence back to the engine through the control valve as previously described. Closing of the valve 30 will be opposed by the pressure of the liquid in the chamber 19, and when the valve 33 is open, the pressure in the chamber 19 will rise in accordance with the pressure built up in the brake actuator and in the brake return chamber 22, due to the restriction imposed on the return flow of the liquid from the actuator by the partially closed valve 41. Since the member 28 and the member 40 are connected by the proportioning beam 46, it is apparent that for a given position of the valve operating element 51, the members 28 and 40 will assume positions where the moments about pivot pin 51A will balance in order to prevent rotation of the beam on the pivot pin. With the pivot pin positioned at the left of the center of the beam, and assuming the valve areas to be equal, it will be apparent that when the beam is in the above balanced position, the pressure acting on the valve 41 to hold it open will be less than the pressure acting on the valve 30 to prevent it closing. This differential is proportional to the pressures in chambers 19 and 22, and is a function of the relative valve diameters and the dimensions of the two arms of the beam, and the amount of liquid which flows through the brake is determined by this differential.

Assuming now that the brake lever 57 is held in a predetermined position to effect a predetermined degree of brake application, it will be understood that on variation of the pump speed, such for example as an increase in the pump speed, the volume of liquid pumped to the chamber 19 by the pump 6 will increase, and since the valves are previously set in particular positions of restriction, the pressure in the chamber 19 will tend to increase and thus tend to move the valve 30 upward again. At the same time, however, the flow of liquid to the brake actuator through the open valve 33 will also tend to increase and thus raise the pressure in the chamber 22 acting to move the valve 41 upward. Consequently, due to the resilience of the graduating spring, a new condition of balance may be reached wherein both valves are moved upward slightly, with the beam being in balance, and the member 55 moving upward slightly to compress the graduating spring and exert an increased reaction on the driver's foot operating the brake lever 57.

In the event a more severe brake application is required, and the operator depresses the brake lever further, the valves will assume new positions of balance, and when the force exerted to move the member 28 downward becomes great enough, the valve 30 will close completely, and all of the cooling liquid from the pump will pass through the brake actuator and return past the valve 41 as previously described. From this point on, any further graduation of the brake application is effected by moving the valve 41 downward to impose a further restriction on the return flow of the cooling liquid, and to consequently further increase the pressure in the brake actuator to effect a more severe engagement of the friction elements. The graduating spring interposed between the foot of the operator and the valve mechanism operates to permit small fluctuations in the positioning of the valves without the necessity for compensation by the operator, but at the same time, gives the operator a feel of the operation of the brake valve mechanism.

It will be apparent that at any given pressure in chamber 21 for example, the pressure differential between the chambers 21 and 22 with the valve 30 not fully closed is determined by the respective areas of the valves 30 and 41, and by the proportions of the two arms of the beam on either side of the pivot pin 51A. If it is desired to increase that differential, the pin may be moved further to the left toward the pin 47 as desired, in which case the valve 30 may be closed when lower pressures exist in the chambers 19 and 22, and all of the cooling liquid will be passed through the brake actuator when the said lower pressures are reached. It will also be apparent, that if desired, the pin 51A may be placed mid-way between the pivot pins 47 and 48, and the inherent differential between the chambers 21 and 22 adjusted by varying the respective areas of the valves 30 and 41.

During normal operation of the system, and assuming that the brake lever is in released position, it will be apparent that with the engine and pump running, there will always be a positive pressure in the chambers 19 and 20 due to the restriction in the conduits leading from the chamber 20 back to the radiator, and although this pressure will not be great, it will vary with the speed of the engine pump, and unless compensated for, might cause this pressure to open valve 33. This difficulty is overcome by the present invention, however, in view of the fact that the diameter of that portion of the first pressure responsive member 28 which is slidably mounted in the control valve cover, is of the same diameter as the effective diameter of the valves 30 and 33, and consequently, with the valve 30 in open position, this pressure in chamber 20 acts upward on the member 28 to hold the valve 33 closed, and acts downward on the valve 30 with a substantially equal force tending to open the valve. Consequently the member 28 is balanced during the above condition of operation, and the force required to initiate closing movement of the valve 30 by the operator is substantially the same, regardless of the speed of operation of the pump 6.

The valve 41 is balanced in a similar manner, it being pointed out that the pressure responsive member 40, as shown in this embodiment of the invention, is of substantially the same diameter as the restricting valve 41. Consequently, any back pressure building up in chamber 23 during operation of the brake acts on member 40 to move it upwardly and with equal force on valve 41 to move it downwardly. Accordingly, the operation of valve 41 is unaffected by variations in pressure in chamber 23.

It will also be noted, that with the brake applied, liquid flows back to the engine from the brake actuator through the upper chamber 23 in the valve, and since it is undesirable to have all the liquid flow from this chamber back to the radiator through the vent line 25 instead of going through the engine, the check valve 36, lightly held in closed position by means of the spring 38, is opened by the pressure of the liquid in the chamber 23 to permit the direct return of the liquid from that chamber to the engine through the chamber 20 and the conduit 14. Also, the construction is such that as the valve 30 moves downward toward closed position, the spring 38 is extended, so that under this condition of operation, very little force is exerted to keep the valve 36 in closed position. Another reason for the use of the check valve is that it is desirable to use a vent line 25 of small diameter and liquid carrying capacity, making it necessary to provide another return path for the cooling liquid having a greater capacity. The check valve also insures that substantially all the liquid passing through the brake passes through the vehicle engine.

It has also been found desirable in certain installations to provide for mechanical operation of a brake mechanism on the vehicle in the event of failure of the liquid pressure operated system, and to this end, the slidably mounted valve seat member 43, normally maintained in the position shown in sealing engagement with the lower face of the cover 29 by means of the spring 45, and also by the pressure differential acting on the valve seat member between the chambers 22 and 23. During normal operation of the brake valve mechanism, there is liquid flowing past the valve 41 whenever the brake is applied and the valve does not remain in engagement with the valve seat 43 unless the slip in the pump, which is preferably of the positive displacement type, is so great as to permit the valve to be closed fully to maintain a static pressure in the brake actuator determined by the leakage in the pump, but without any flow through the brake actuator.

In the event of failure of the brake system, however, over travel movement of the brake lever 57 in a counter-clockwise direction will cause the valve 41 to engage the valve seat 42 and thereafter force the valve seat member 43 downward against the light spring 45 a sufficient distance to permit operation of a mechanical brake on the vehicle by the brake lever 57. Consequently, a lever arm 88 is provided on the lever 57 adapted, on said over travel movement, to actuate a brake rod or brake operating member 89 which may be connected to any suitable mechanical brake of conventional type, not shown, on the vehicle, it being understood that on upward movement of the rod, it is effective to apply the mechanical brake. A bore 90 is provided adjacent the end of the lever, having a spherically shaped socket portion 90A at the upper end adapted to receive a similarly shaped spherical portion 91 of an adjustable nut 92 threadedly mounted on the upper end of the brake rod 89. The nut is spaced from the socket as shown when the brake lever is in release position, thus providing a lost motion which permits normal operation of the control valve mechanism 13 without operation of the mechanical brake. The degree of lost motion may be adjusted to correspond to the degree of brake lever movement required for the normal operation of the brake valve mechanism. With regard to the normal positioning of the parts of the system with the brake lever in release position, it might be added that the return spring on the brake lever operates to urge the brake lever in a clockwise direction, and that the pivot pin 51A is accordingly urged upward by virtue of a connection between the flange 54 of member 55 and the graduating spring cage 53 afforded by a suitable snap ring 93. A flange 94 on the member 40 acts as a stop against the bottom surface of the cover 29 to position this member, and the valve 33 acts as a stop to limit upward movement of the member 28. Consequently, the brake lever return spring acts in release position to maintain all of the valve parts in the position shown, and also acts as a stop to maintain the brake lever normally in release position. In the event mechanical operation of a brake, as described above, is not required, the sleeve 43 may be locked in position by means of a screw 92a adapted to enter a groove 92B in sleeve 43.

There has thus been provided by the above control valve mechanism, means for controlling a by-pass circuit between the conduits 11 and 14 to either pass all of the liquid directly back to the engine, or to pass any desired portion or all of the liquid through the brake actuator, together with control valve means so constituted as to permit any desired pressure differential to be chosen for the chambers 19 and 22 for any position of the given brake lever force, it being reiterated again that the pump is preferably of the positive displacement type such as a gear or vane pump. It will also be understood that the valves or the beam or both may be so proportioned if desired as to close valve 30 and pass substantially all of the cooling liquid through the brake during an initial small movement of the brake lever from release position, the pressure in the brakes thereafter being controlled by the operation of the restricting valve 41. Although the pump is shown in Fig. 1 as being driven by the vehicle engine, it may be driven at a constant speed if desired as by a separate motor.

Referring now to Fig. 2 of the drawings, a modified form of brake valve mechanism is shown, wherein a portion of the force required to operate the brake lever is balanced out, in order to provide a lesser pedal force on the brake pedal. Such a system might be particularly desirable for brakes of large capacity requiring larger volumes of cooling liquid, and consequently larger valves in the control valve mechanism in order to permit passage of such liquid without appreciable restriction. The valve mechanism shown in this Fig. 2 includes a valve housing 18 having an inlet chamber 19, an outlet chamber 20, a brake supply chamber 21, a first brake return chamber 22, and a second brake return chamber 23 as shown. An inlet port 12 serves to connect pump conduit 11 with chamber 19, while an outlet port 13A is connected with conduit 14 leading to the engine. Outlet chamber 21 has an outlet port 26 connected to the brake actuator through conduit 60, and return chamber 22 has a port 27 connected to the discharge conduit 78 of the brake actuator through conduit 61. A vent port 24 is provided in the wall of chamber 23 as previously described, and is connected to the upper tank of the radiator through vent pipe 25. A first pressure responsive member 28 is slidably mounted in cover 29 of the control valve as shown, and is provided with an outlet valve 30 adapted on downward movement to engage valve seat 31 in the housing. A stem on the lower end of the member 28 carries a normally closed brake supply valve 33 maintained in position on the stem by a means of a suitable snap ring 35, the valve seating against seat 34 in the valve housing. A check valve 36 is slidably mounted on the upper portion of the member 28 and is normally urged against a valve seat 37 in cover plate 29 by means of a spring 38 interposed between the valve 30 and the lower side of the check valve.

Referring now to the right side of the valve, a second pressure responsive member 40 is slidably mounted in the cover plate 29, and is provided with a restricting valve 41 adapted to engage a valve seat 42 on the upper end of a valve sleeve 43 having a flange 94 normally maintained in sealing engagement with the cover of the valve body 18 by means of a spring 45 as shown. A proportioning beam 46 is connected at its left end to the member 28 by means of a pivot pin 47, the right end of the beam resting against the pivot pin 48 mounted on the upper end of the right hand member 40. A valve operating element 51 is provided having a graduating spring 52 enclosed in a cage 53, the graduating spring at its lower end engaging a flange 54 on a beam operating member 55 pivotally connected to the beam by the pivot pin 51A. The valve operating element 51 is adapted to be connected to a brake operating lever, not shown, in the same manner as shown in Fig. 1.

In order to balance out a portion of the force required to operate the valves, a first balance piston or pressure responsive balancing member 96 formed on the lower end of the valve 33 is slidably mounted in a first balancing cylinder 97 formed in a cylinder member 98 secured in the valve housing in any suitable manner, passages 99 and 100 serving to connect the outlet chamber 21 with the outlet port 26. A spring 101 may be mounted between the lower end of the cylinder and the bottom end of the piston if desired, in order to normally urge the valve member 33 upward to the position shown. The member 28 is provided with passages 102 and 103 which served to connect the cylinder at all times with the chamber 20, thus subjecting the piston to an upward pressure corresponding to the pressure in that chamber. These passages, which tend to restrict the flow of liquid therethrough, give the piston a dashpot action to delay sudden movement of the valves by the operator, since the piston 96 acts as a pump and on downward movement of the member 28, pumps liquid from the cylinder upward into the chamber 20, and on upward movement draws it back into the cylinder. During initial operation of the valve mechanism to close the valve 30, the pressure in the chambers 19 and 20 is substantially equal and thus the pressure in chamber 20 acts upward on the portion of member 28 which is slidably mounted in the valve cover, and substantially the same pressure exerts an upward force on the piston 96. In the embodiment shown, the construction is such that 50% of the force required to operate the valves is balanced out. The area of the slidably mounted portion of member 28 is substantially the same as that of the piston 96, and the sum of these areas is the same as the area of each of the valves 30 and 33. Thus, with the valve 33 closed as shown, the pressure acting upward on the valve assembly and the pressure acting downward is the same, and this pressure acts in both directions on substantially the same areas, thus causing the valve to be balanced in the closed position shown so that no apprecible effort is required to keep the valve 33 closed. It is also noted that the upper side of the piston 96 is acted on and urged downwardly at all times by the pressure in the brake supply chamber 21. Although the valves in the present instance are shown as each having the same area as the sum of the areas of the piston and the slidable portion of the member 28, other proportions may be chosen, but in the event the valve is to be fully balanced in the position shown against the pressures in the chambers 19 and 20, it is essential that the sum of the areas of the piston and the slidable portion of the member 28 substantially equal the area of each of the valves 33 and 30.

Referring now to the right side of the valve, it will be noted that a second piston or pressure responsive balancing member 104 is formed on the lower end of the member 40, this piston being slidably mounted in a second balancing cylinder 105 formed in a cylinder member 106 secured to the lower end of the housing, downward movement of the piston being opposed if desired by means of a return spring 107. Passages 108 and 109 in the member 40 serve to connect the cylinder at all times with the second return chamber 23 above the valve 41. Thus the piston is subjected on its lower side to the pressure of the liquid in the chamber 23 returning from the brake actuator and into the chamber 23 past the restricting valve 41, while the upper side of the piston is acted on downwardly by the pressure of the liquid below the valve returning from the brake actuator through the port 27. Here again, in order that 50% of the force required to operate the valve mechanism may be balanced out, the areas of the member 40 and the second balancing member 104 are substantially the same, and their sum is substantially equal to the area of valve 41. If more or less force is to be balanced out, the areas of balancing members or pistons 96 and 104 may be correspondingly increased or decreased, but if the effect of back pressure in chambers 20 and 23 is to be balanced out as heretofore described, the parts should be so constituted that the sum of the areas of member 28 and piston 96 equal the area of valve 33, and that the sum of the areas of member 40 and balancing piston 104 equal the area of valve 41.

In the operation of the control valve as shown in Fig. 2, it will be apparent that on downward movement of the members 28 and 40, some of the liquid supplied by the pump to the chamber 19 will pass through the open valve 33 into the chamber 21, and thence to the brake actuator and back to the brake return chamber 22, and thence to the engine radiator through the paths already described. The pressure will be increased in the brake supply chamber 21 and in the brake return chamber 22 as previously described, with the pressure in the chamber 21 being at all times greater than that in the chamber 22, due to the construction of the valve mechanism as previously described. Under this condition of operation, the pressures in the chambers 21 and 22 will be greater than the pressures in the chambers 20 and 23, and consequently there will be a downward force acting on the balancing pistons which operates to assist the operator in applying the brake pedal. This degree of assistance can of course be determined by the relative areas of the balancing pistons and the control valves 30, 33, and 41. As heretofore stated, however, the balanced condition of the member 28 will be maintained as described when the valve 33 is closed, and in like manner, due to the fact that the piston 104 is of the same area as the slidable portion of the member 40, and that the sum of these two areas is equal to the area of the valve 41, the member 40, will with respect to back pressure in chamber 23, also be balanced in the position shown with the pressure in that chamber acting upward on the slidable portion of the member 40 and on the piston 104, and downward on the valve 41. Regardless of the back pressure building up in chamber 23 during the operation of the brake, the force of this back pressure acting upward on the member 40, plus the force of this same pressure acting upward on the piston 104, will be the same as the force acting downward, this latter force acting of course on the valve 41. Otherwise, the valve operates as described in connection with Fig. 1, the vent line 25 preventing the build-up of pressure in the chamber 23 with the brakes released, which would otherwise tend to cause dragging brakes, and the check valve 36 acting to provide sufficient capacity for the return of liquid from the brake actuator to the vehicle radiator, it being pointed out again, that the vent conduit 25 is preferably small, and therefore of insufficient capacity to handle the returning cooling liquid. In the event it is desired to make the vent conduit of sufficient size, the check valve 36 may be eliminated if desired, provided this does not cause dragging of the brake, and does not reduce the flow of cooling liquid through the engine too much. If a mechanical brake is desired as set forth in connection with Fig. 1, the operating mechanism for the control valve element 51 may be as shown in Fig. 1, and slidable valve seat sleeve 43 will permit this type of operation in the same manner as shown in Fig. 1.

There has been thus provided in connection with the valve shown in Fig. 2, mechanism for maintaining a differential between the brake supply chamber and the brake return chamber which is a fixed percentage of the pressure when the valve 30 is not fully seated, together with means following the seating of said valve to further control the return flow of liquid in order to further increase the pressure of liquid in the brake actuator and to effect a corresponding increase in the degree of brake application. The valves are balanced in the off position shown with respect to back pressures in chambers 20 and 23, and a portion of the force required to operate the valves is supplied by the pressure of the cooling liquid supplied to the brake by the control valve. Thus the valve can be so designed as to provide any desired degree of pedal pressure for a given control valve capacity. The pistons 96 and 104 also provide a desirable dash pot action if desired, as already described in connection with the operation of the piston 96, it being noted that the piston 104 also acts as a pump, and on downward movement thereof is operable to pump liquid from the cylinder 105 into the chamber 23 through the passages 108 and 109, and to draw the liquid back into the cylinder on reverse movement. By properly restricting the passages 102, 103, 108, and 109, any desired degree of dash pot action may be obtained. Such a dash pot action is effective to eliminate over travel or sudden opening or closing of the valves in the event the operator endeavors to depress or release the brake control lever too suddenly. Such a dash pot action may also be utilized to effectively damp out any vibration which might otherwise occur in the moving parts of the control valve mechanism, it being understood in this connection, that such vibration may occur in valves of this general type, due to turbulence in the flow of liquid and a tendency for the valves to "hunt" back and forth in order to adjust themselves to the turbulent flow of the liquid therethrough.

Figure 3:
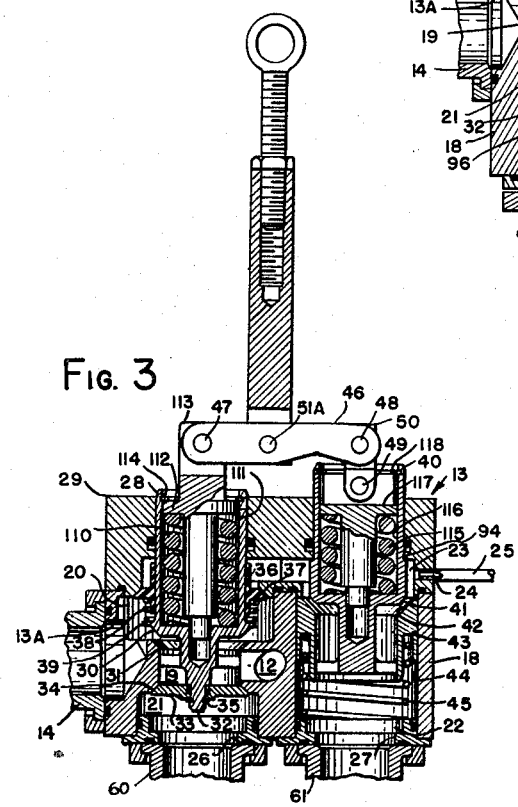
Fig. 3 is a sectional view of another form of the brake control valve mechanism.

Referring now to Fig. 3 of the drawings, a modified form of the control valve 13 is shown, this valve having a housing 18 provided with an inlet chamber 19, an outlet chamber 20, a brake supply chamber 21, a first brake return chamber 22, and a second brake return chamber 23 connected to the upper tank on the vehicle radiator by means of a vent port 24 and a vent conduit 25. An outlet port 26 in the chamber 21 is adapted to be connected to the brake actuator through conduit 60, while the port 27 in the brake return chamber 22 is adapted to be connected to the brake actuator by means of conduit 61 as shown in Fig. 1. The chamber 20 is connected to the engine through a port 13A and conduit 14, while the chamber 19 is supplied with cooling liquid from the pump 6 through conduit 11 and inlet port 12. Thus, the control valve mechanism of Fig. 3 is interchangeable with the control valve mechanism shown in Fig. 1, the connections from the control valve ports to the remaining portion of the system being the same as those shown in Fig. 1.

A first pressure responsive member 28 is slidably mounted in a cover member 29 of the control valve, being provided at its lower end with an outlet valve 30 adapted on downward movement to engage a valve seat 31 and close off communication between chambers 20 and 19. A stem 32 extends downward at the lower end of the member 28, and a brake supply valve 33 is secured to this stem, and is normally in engagement with the valve seat 34, the valve being maintained on the stem by means of a suitable snap ring 35. A normally closed check valve 36 slidably mounted on the upper portion of the member 28 is normally maintained in closed position against the seat 37 by means of a light spring 38 interposed between a flange 39 on the valve member and the lower surface of check valve 36. On the right side of the valve, a second pressure responsive member 40 is slidably mounted in the cover as shown and has a restricting valve 41 formed adjacent its lower end and adapted on downward movement to approach a valve seat 42 and to thus impose a restriction to the flow of liquid between the chambers 22 and 23. A slidable valve seat member 43 having the valve seat 42 is provided as in Fig. 1, the sleeve being positioned as shown by spring 45.

In the present instance, individual graduating springs are associated with each of the members 28 and 40 to take the place of the single graduating spring 52 utilized in the constructions of Figs. 1 and 2. A graduating spring 110 is positioned in a bore 111 in the member 28, this spring being positioned between the bottom of the bore and a flange 112 on a member 113 positioned in the upper end of the bore 111, and maintained in the bore by means of a suitable snap ring 114. In like manner a graduating spring 115 is similarly disposed in a bore 116 in member 40, the lower end of the spring resting against the bottom of the bore, and the upper end of the spring being adjacent the lower face of a member 117 maintained in the bore by a snap ring 118. The upper end of member is connected to proportioning equalizing beam 46 by pivot pin 47, and the member 117 is connected to the right end of the beam by means of pivot pins 48 and 49 and link 50. The valve operating element 51 is adapted to be connected to a brake operating lever as shown in Fig. 1, and this element is connected to the beam at a point to the left of the center line between the pivot pins 47 and 48 by means of a pin 51A. In the construction as shown, the valves 30 and 41 are preferably of the same area, and these areas are the same as the areas of the members 28 and 40 which are slidably mounted in the valve housing cover 29, the valves in the position shown thus being balanced with respect to any pressures existing in the chambers 20 and 23.

The operation of the valve mechanism is essentially the same as that described in connection with the valve mechanism in Fig. 1, but the present construction permits the placing of the graduating springs in the interior of the members 28 and 40, thus permitting the valve operating element 51 to be shorter if desired to meet space requirements. Although the graduating springs are separated, it will be apparent that during operation of the valve, they act in series between the control valves and the valve operating element in the same manner that the graduating spring 52 in Fig. 1 and in Fig. 2 is in series between the operator's foot pedal and the valves being operated. Each of the graduating springs is compressible in order to permit the valves to adjust their positions in accordance with the pressure conditions existing in the control valve mechanism without requiring corresponding movement of the driver's foot, but the springs at the same time serve to transmit the valve forces from the valves to the valve operating element and to the operator's foot pedal in order to give him a feel of the operation of the brake valve mechanism. On downward movement of the control element, the valves 30 and 41 tend to close, while the valve 33 opens in order to permit the passage of a portion of the liquid supplied to the chamber 19 by the pump through the brake supply port 26 to the brake actuator and thence back to the brake return chamber 22. The return flow of the fluid from the chamber 22 into the chamber 23 and back to the engine radiator, as previously described, is restricted by the valve 41, and consequently the pressure in the entire system extending between the chambers 21 and 22 is increased with the pressure in chamber 22 being less than that in chamber 21 as was the case in connection with the mechanism in Fig. 1. The closing of the valve 30 is opposed by the increased pressure in chamber 19, while the closing of the valve 41 is opposed by the pressure in the first return chamber 22. As the valve control element 51 is moved downward, these pressures increase, and increased force is required on the part of the operator to effect such movement. In the event the force exerted on the member 28 is great enough to overcome the maximum pressure which can be maintained by the pump in chamber 19, the valve 30 closes completely, and thereafter, any increase of pressure in the brake actuator and in the chamber 22 is effected by further closing the valve 41, it being understood that this action is still under the full control of the vehicle operator. As long as the valve 30 is partially open, the pressure differential existing between chambers 21 and 22 is dependent on the areas of the valves 30 and 41, and on the position of the pivot pin 51A which serves to connect the valve operating element with the beam 46, the differential being a fixed percentage of the pressure as heretofore stated. After the valve 30 is fully closed, however, as just described, the differential existing between the chambers 21 and 22 will be dependent on the amount of liquid pumped by the pump 6 through the control valve and on the position of the valve 41.

From the foregoing, it will be apparent that novel control valve mechanism has been provided by the present invention, so constituted as to readily and efficiently control the flow of cooling liquid through a liquid cooled brake actuator of the type operated by the pressure of that liquid, as well as being so constituted as to provide adequate control of the pressure of the liquid flowing through the actuator in order to permit the operator to readily effect a desired degree of brake application. The amount of liquid flowing through the brake under normal conditions, is determined in accordance with the degree of brake application, and consequently in accordance with the degree of heat required to be absorbed by the brake mechanism. Under conditions of severe operation, however, the construction is such that all of the liquid pumped to the brake valve by the vehicle pump 6 may be passed through the brake actuator for maximum cooling effect, and restricted in the return line in order to govern the pressure of the liquid in the actuator and correspondingly the degree of brake application. The valve mechanism can be so constructed, as heretofore described, as to permit an over travel movement of the brake pedal to effect an operation of a mechanical brake mechanism if desired, and in addition, the valve mechanism may be so constructed as to provide any desired pedal pressure for the operation of the brake. Thus, in large brake installations where high pressures and/or large volumes of cooling liquid are required with correspondingly larger valves, a portion of the force required to operate the valve mechanism may be supplied by the pressure of the circulating liquid itself as previously described in connection with Fig. 2, it being understood that the same construction can be utilized if desired in the valve mechanisms shown in Figs. 1 and 3. The differential maintained between the brake supply chamber 21 and the brake return chamber 22 may be readily adjusted by changing the location of the pivot pin 51A on the beam 46, or may be adjusted by changing the relative areas of the valves, or by both methods, as will be readily apparent to those skilled in the art. In addition to the foregoing, the valve mechanism is so constituted as to be unaffected in its operation by back pressures which may exist in the valve housing due to the liquid passing therethrough. Vent means have been provided for preventing the build-up of back pressure in the brake actuator itself, thus preventing the possibility of dragging brakes which might be detrimental to the brake mechanism.

While the invention has been illustrated and described in considerable detail, it is to be understood that the same is not to be considered as limited thereby, and that other embodiments of the invention may suggest themselves to those skilled in the art. Reference will be had, therefore, to the appended claims for a definition of the limits of the invention.

What is claimed is:

1. Brake control valve mechanism for a brake of the type adapted to be cooled by a circulating liquid and actuated by the pressure of said liquid, said mechanism including a casing having an inlet chamber, an outlet chamber, a brake supply chamber, a first brake return chamber, a second brake return chamber adjacent said first named brake return chamber, and a liquid connection between said second return chamber and said outlet chamber, said chambers in the order named having respectively an inlet port, an outlet port, a brake supply port, a brake return port, and a vent port, a brake supply valve for normally preventing communication between said inlet and brake supply chambers, a normally open outlet valve connected to the brake supply valve and permitting communication between said inlet and outlet chambers, a normally open restricting valve for permitting communication between said first brake return chamber and said second return chamber, a proportioning beam pivotally connected adjacent one end thereof to said brake outlet valve and adjacent the opposite end thereof to said restricting valve, and means for operating said valves to open said supply valve and to urge said outlet valve and said restricting valve toward closed positions, said operating means including a valve operating element having a pivotal connection with said beam intermediate said pivotal connections of said beam to said valves.

2. Brake control valve mechanism as set forth in claim 1, including a check valve in said connection between said second return chamber and said outlet chamber for normally preventing communication between said second return chamber and said outlet chamber, said valve being resiliently biased toward closed position and adapted to open when the pressure in said second return chamber exceeds the pressure in said outlet chamber.

3. Brake control valve mechanism as set forth in claim 1, wherein resilient means is interposed between said valve operating element and said outlet and restricting valves.

4. Brake control valve mechanism as set forth in claim 1, wherein the areas of said outlet and restricting valves are such and the pivotal connection between said valve operating element and beam is so positioned thereon that when the moments about the pivotal connection of the beam with the valve operating element are balanced, the difference in pressure between the brake supply chamber and the first brake return chamber is a predetermined percentage of the pressure in said brake supply chamber.

5. Brake control valve mechanism as set forth in claim 1, including a separate movable member for operating a mechanical brake, said member having a lost-motion connection with said valve operating element, and a movable valve seat engageable by said restricting valve, said lost-motion connection permitting closing of said supply valve and engagement of the restricting valve with said seat without movement of said movable member, and said movable seat permitting movement of said restricting valve beyond normal closed position and mechanical brake applying movement of said movable member by said valve operating element.

6. Brake control valve mechanism as set forth in claim 1, including a first pressure responsive member having an operative connection with said outlet and supply valves and responsive to the pressure in said outlet chamber for urging said outlet valve toward open position, and a second pressure responsive member having an operative connection with said restricting valve and responsive to the pressure in said second return chamber for urging the restricting valve toward open position.

7. Brake control valve mechanism as set forth in claim 1, including a first pressure responsive member having an operative connection with said outlet valve and subjected to the pressure in said outlet chamber for urging the outlet valve toward open position, and a second pressure responsive member having an operative connection with said restricting valve and subjected to the pressure in said second brake return chamber for urging the restricting valve toward open position, the effective area of the first pressure responsive member being substantially the same as that of each of said outlet and supply valves, and the effective area of said second pressure responsive member being substantially the same as that of said restricting valve.

8. Brake control valve mechanism as set forth in claim 1, including means for regulating the speed of movement of said outlet and supply valves and of said restricting valve in response to brake applying movement of said valve operating element, said means including a first balancing cylinder having a pressure responsive member therein having an operative connection with said outlet and supply valves, said cylinder being connected to said outlet chamber by a restricted liquid passage, and a second balancing cylinder having a pressure responsive member therein having an operative connection with said restricting valve, said second balancing cylinder being connected to said second return chamber by another restricted liquid passage.

9. Brake control valve mechanism as set forth in claim 1, including a first pressure responsive member having an operative connection with said outlet and supply valves and subjected to the pressure in said outlet chamber for urging said outlet valve toward open position, a second pressure responsive member having an operative connection with said restricting valve and subjected to the pressure in said second return chamber for urging the restricting valve toward open position, a first pressure responsive balancing member having an operative connection with said outlet and supply valves and subjected to the pressure in said outlet chamber for urging said outlet valve toward open position and subjected to the pressure in said supply chamber for urging the outlet valve toward closed position, and a second pressure responsive balancing member having an operative connection with said restricting valve and subjected to the pressure in said second return chamber for urging the restricting valve toward open position and subjected to the pressure in said first return chamber for urging the restricting valve toward closed position, the sum of the effective areas of the first pressure responsive member and the first pressure responsive balancing member being substantially equal to the area of said outlet valve, and the sum of the areas of said second pressure responsive member and said second pressure responsive balancing member being substantially equal to the area of said restricting valve.

10. Brake control valve mechanism as set forth in claim 1, including means for permitting over travel movement of said valve operating element following closing of said outlet and restricting valves, said means including a movable valve seat member engageable by said restricting valve to prevent communication between said first and second brake return chambers, said valve seat member having a normal position and movable to over travel positions, and biasing means for urging said valve seat member toward said normal position.

11. Brake control valve mechanism for a brake of the type adapted to be cooled by a circulating liquid and actuated by the pressure of said liquid, said mechanism including a casing having an inlet chamber, an outlet chamber, a brake supply chamber, a first brake return chamber, and a second brake return chamber adjacent the first brake return chamber, said chambers being provided respectively and in the order named with an inlet port, an outlet port, a brake supply port, a brake return port, and a vent port, means for controlling the flow of liquid between said inlet and outlet chambers and said inlet and brake supply chambers comprising an outlet valve, and a brake supply valve spaced therefrom and connected thereto for movement therewith, said valves being operable in one position to respectively permit the flow of liquid between said inlet and outlet chambers and prevent the flow of liquid between said inlet and brake supply chambers, operable on movement toward another position to permit the flow of liquid from said inlet chamber to each of said outlet and brake supply chambers, and operable on movement to said another position to prevent the flow of liquid between said inlet and outlet chambers and to permit unrestricted flow of liquid from said inlet chamber to said brake supply chamber, a check valve biased to a closed position for normally preventing the flow of liquid between said outlet chamber and second return chamber and movable to open position by the liquid in said second return chamber when the pressure in said second return chamber exceeds the pressure in the outlet chamber, a restricting valve for controlling the flow of liquid from said first return chamber to said second return chamber, said valve in open position permitting the flow of liquid from the first return chamber to the second return chamber and being operable on movement toward closed position to progressively impose a restriction to said flow, a first pressure responsive member connected to said outlet and brake supply valves for movement therewith, said member being responsive to the pressure in said outlet chamber and operable to oppose closing movement of said outlet valve, a second pressure responsive member connected to said restricting valve for movement therewith subjected to the presure in said second return chamber and operative to oppose closing movement of the restricting valve, a proportioning beam having a pivotal connection with said outlet and brake supply valves and a pivotal connection with said restricting valve spaced from the first named pivotal connection, means for operating the valves including a valve operating element having a pivotal connection with the beam intermediate the first two pivotal connections, and resilient means for normally maintaining said outlet valve in open position, said brake supply valve in closed position, and said restricting valve in open position.

12. Brake control valve mechanism as set forth in claim 11, wherein said pressure responsive members and valves each have substantially the same area, and said pivotal connection between said valve operating element and said proportioning beam is connected to the beam at a point between the center of said beam and the pivotal connection of said beam with said outlet and brake supply valves.

13. Brake valve mechanism as set forth in claim 11, wherein said pressure responsive members and valves each have substantially the same area, said pivotal connection between said valve operating element and said proportioning beam is positioned on the beam at a point between the center of said beam and the pivotal connection of said beam with said outlet and brake supply valves, a graduating spring is interposed in series in the connection between said beam and said inlet and brake supply valves, and a second graduating spring is interposed in series in the connection between said beam and said restricting valve.

14. Control valve mechanism as set forth in claim 11, including a first balancing cylinder for the outlet and supply valves having a first balancing piston slidably mounted therein and connected to said valves for movement therewith and a second balancing cylinder for the restricting valve having a piston slidably mounted therein and connected to the restricting valve for movement therewith, the first cylinder having a connection with said outlet chamber and the pressure in the outlet chamber acting on one side of the first balancing piston to urge said outlet valve toward open position, the other side of said first balancing piston being subjected to the pressure in the brake supply chamber to urge the outlet valve toward closed position, and the second cylinder having a connection with said second return chamber, one side of the second balancing piston being subjected to the pressure in said second balancing cylinder to urge the restricting valve toward open position, the other side of the second balancing piston being subjected to the pressure in said first return chamber to urge the restricting valve toward closed position, said connections to said balancing cylinders being such as to appreciably restrict the flow of liquid therethrough.

15. Brake control valve mechanism for a brake of the type adapted to be cooled by a circulating liquid and actuated by the pressure of said liquid, said mechanism including a casing having an inlet chamber, an outlet chamber, a brake supply chamber, a first brake return chamber, a second brake return chamber adjacent said first brake return chamber, and a one-way connection between said second return chamber and said outlet chamber for permitting the flow of liquid from the second return chamber to the outlet chamber, said chambers in the order named having respectively an inlet port, an outlet port, a brake supply port, a brake return port, and a vent port, a brake supply valve for controlling the flow of liquid between said inlet and brake supply chambers, an outlet valve for controlling the flow of liquid between said inlet and outlet chambers, said valves having an operative connection therebetween, a restricting valve for controlling the flow of liquid between said first and second return chambers, and means for operating said valves to move the brake supply valve toward open position, the outlet valve toward closed position, and the restricting valve toward closed position, said means including a valve operating element, valve actuating means having an operative connection with said brake supply and outlet valves, an operative connection with said restricting valve, and a common operative connection with said valve operating element, said actuating means including force proportioning means for proportioning the forces exerted on said brake supply valve and inlet valve on the one hand and on said restricting valve on the other hand in a predetermined ratio.

References Cited in the file of this patent

UNITED STATES PATENTS

| 1,797,395 | Beecher | Mar. 24, 1931 |
| 1,928,144 | Vickers | Sept. 26, 1933 |
| 2,051,286 | Boykin | Aug. 18, 1936 |
| 2,206,658 | Boldt | July 2, 1940 |
| 2,406,304 | Levy | Aug. 20, 1946 |
| 2,414,753 | Majneri | Jan. 21, 1947 |
| 2,451,335 | Groves | Oct. 12, 1948 |
| 2,484,888 | Hollerith | Oct. 18, 1949 |
| 2,680,654 | Edge et al. | June 8, 1954 |
| 2,716,946 | Hardy | Sept. 6, 1955 |